Oct. 9, 1962

T. C. POULTER ETAL 3,058,058

MAGNETIC CONCENTRICITY GAGE

Filed Aug. 11, 1959

INVENTORS
Thomas C. Poulter
David E. Brink
Paul E. Seaward

BY John O. Evans, Jr.

ATTORNEY

Oct. 9, 1962

T. C. POULTER ETAL 3,058,058

MAGNETIC CONCENTRICITY GAGE

Filed Aug. 11, 1959

INVENTORS
Thomas C. Poulter
David E. Brink
Paul E. Seaward

BY *John O. Evans, Jr.*

ATTORNEY

3,058,058
MAGNETIC CONCENTRICITY GAGE

Thomas C. Poulter, David E. Brink, and Paul E. Seaward, all of Palo Alto, Calif., assignors to Jet Research Center, Inc., Arlington, Tex., a corporation of Texas
Filed Aug. 11, 1959, Ser. No. 832,928
3 Claims. (Cl. 324—34)

This invention relates to a magnetic concentricity gage, and more particularly to such a gage in which a magnetic-field pickup accurately locates the exact position and/or the magnitude of eccentricity of a ferromagnetic barrier embedded in the explosive charge encapsulated in a shaped charge container of zinc or other non-magnetic material.

Accurately locating the exact position of a ferromagnetic object, solidly embedded in a casing, is accomplished by spinning the casing in a magnetic field and picking up small variations in the flux pattern of the encapsulated metal. Using this principle, it is possible to determine whether such an encased object is in its proper position, is off center, tilted or both.

The magnetic concentricity gage was developed to determine the exact location of a piece of steel which is encapsulated in a high-explosive charge used for oil-well blasting. In this application, it is essential to check the exact placement of the steel piece after the explosive charge has been loaded, for this curved steel barrier plays a key role in controlling the magnitude and direction of the high-velocity jet of metal discharged when the charge is detonated.

In the drawings:

FIG. 1 shows the main unit of the gage. The meter, amplifier and power supply are located in a special box attached to the outside of a building in which the main unit is housed.

Figure 1:
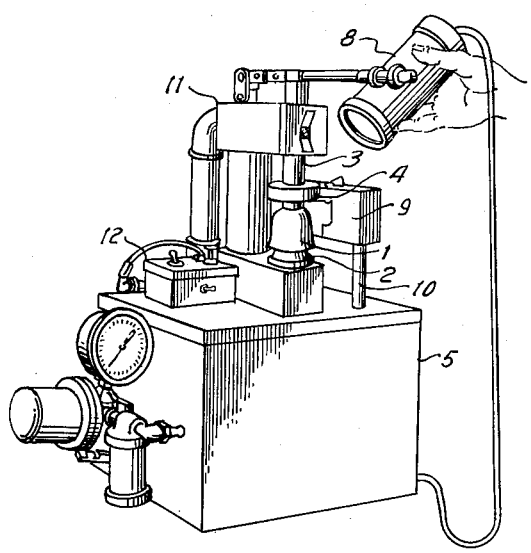
FIG. 1 is a perspective view of an exemplary form of apparatus in accordance with the invention.

The shaped charge 1 is held against the brass drive spindle 2 by a brass idler shaft 3. Equally spaced numbers on the periphery of an aluminum indexing wheel 4, fastened to the brass idler shaft, are used with a flashtube circuit to indicate the direction of maximum eccentricity of the barrier. When the upper spindle engages the charge, an air motor (not shown) in the housing 5 is started and the upper end of the drive spindle, pressing against the copper cavity liner in the shaped charge causes it to rotate.

Figure 2:
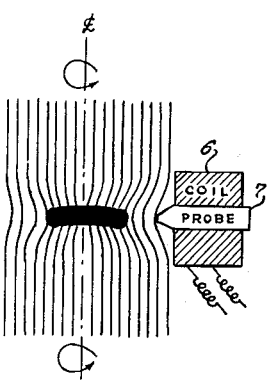
FIG. 2 is a diagrammatic view of a ferromagnetic object spinning in a magnetic field with a probe and coil pickup in the field at the side of the object.

The spinning shaped charge, exposed to a magnetic field, produces a flux pattern. As the steel barrier rotates, possibly tilted or off center, flux variations induce a voltage in a coil 6 that is wound around an iron probe 7 and placed in the plane of the barrier and as close to it as practical. FIGURE 2 shows the principle. The signal voltage is amplified in the linear amp., FIG. 3, and not only gives a measure of the amount of eccentricity but also fires a flashtube 8 once each revolution to give an indication of the position of maximum eccentricity.

The sensitive pickup coil probe consists of 22,000 turns of No. 36 enameled wire wound on a bobbin. The core is made from a 9/32-in. stack of 0.014-in. silicon iron laminations 1/16-in. wide by 3 3/8-in. long. The 1/8-in. probe point width was achieved by shearing the ends of the laminations to the desired shape before they were inserted into the coil bobbin. The whole assembly is vacuum-varnished for rigidity. A rigid mounting is fabricated from hardwood pieces 9 and heavy aluminum pillars 10, so that relative motion between pickup probe, rotating steel barrier and magnetic field is due only to the eccentricity of the barrier. A permanent magnet 11, made from two pole-pieces of a magnetron magnet, provides the magnetic field.

Measurements of the voltage, generated in the pickup coil by test pieces of known eccentricity, showed that the coil voltage was directly proportional to both the barrier offset and the barrier rotational speed. At 30 r.p.s., approximately 6 millivolts per thousandth-in. offset was generated in the coil. This voltage is read on a vacuum-tube voltmeter.

Figure 3:
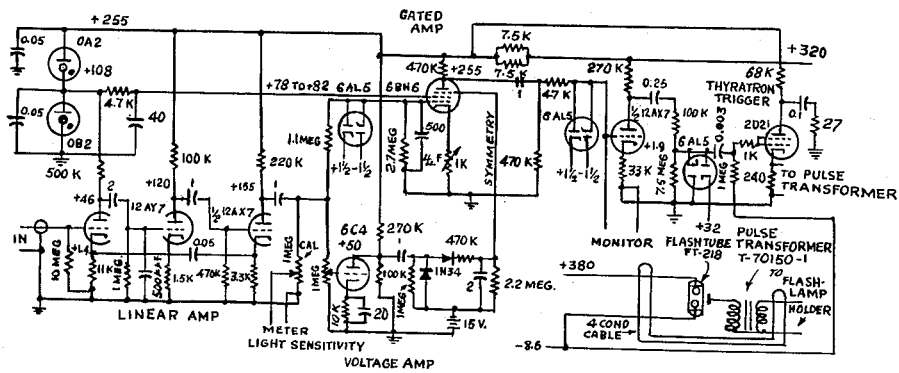
FIG. 3 is a circuit diagram of the electronic circuit for amplifying the output of the pickup coil and measuring the same, and for firing a flashtube to illuminate the shaped charge unit being tested.

The flashtube trigger circuit, FIG. 3, uses a 2D21 thyratron switch to discharge a capacitor across the primary of a high-voltage pulse transformer whenever the thyratron is fired. The high-voltage pulse from the pulse transformer is applied to the trigger electrode of the flash-tube. The R-C time constant of the charging resistor and energy storage capacitor was chosen to fire the 2D21 reliably to a maximum rate of 60 times a second.

A three-stage amplifier with clipper circuits meets the requirements of the flashtube trigger and satisfies the desired accuracy of position-indication. The phase shift through the amplifier is constant, within a few degrees, over 10 to 100 c.p.s., the range of input frequencies used.

The amplifier output voltages and, therefore, the eccentricity magnitude reading are independent of variations in the barrier rotational speed over a reasonably wide range such as 10 to 100 r.p.s.

A plot of pickup coil voltage measurements versus the barrier rotational speed indicated that the coil voltage increased 6 db for each octave increase in rotational speed. The amplifier-clipper circuit was designed so that output voltage decreases 6 db per octave from 5 to 120 c.p.s. Thus the amplifier output voltage reading for a barrier of given offset remains constant regardless of variations in the air-motor speed.

The amplifier provides output voltage as a linear function of input signal voltage from 0 to 70 millivolts r.m.s. This results in straight-line calibration graphs, FIG. 4, that are easy to read and interpret.

To reduce noise pickup or generation in the input stage, a low-noise dual triode, 12AY7, is used for the first two stages with a special shock resistant tube socket. Also, a tube shield with an NEL-type insert reduces the tube operating temperature. The shield is grounded to the chassis. The input stage uses deposited-carbon resistors and is well shielded. Desired frequency response is obtained by a negative feedback system wherein the voltage developed across the cathode resistor of the third amplifier stage is coupled back to the cathode of the first amplifier. As the feedback capacitor is located in a low-voltage low-impedance path, its voltage rating can be relatively low and the stray capacitance is eliminated.

Spurious firing due to bumping or jarring the gage is eliminated by incorporating a 6BN6 gated-beam tube controlled by an integrating network with a long time constant. A portion of the output voltage from the linear amplifier is amplified in the 6C4 voltage amplifier, rectified and turns on the gated-amplifier after a suitable signal persists for several seconds.

Figure 4:
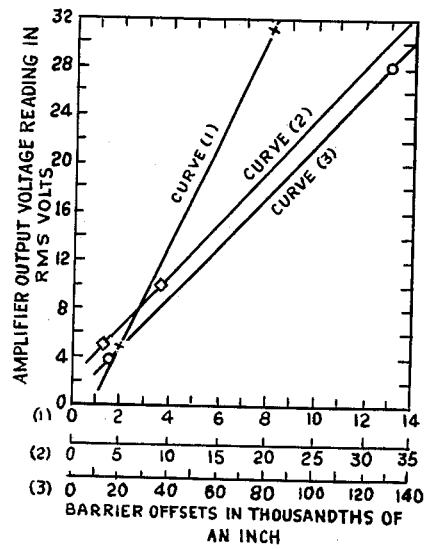
FIG. 4 is a graph showing barrier offset in terms of amplifier output voltage.

The feedback amplifier output voltage goes directly to the vacuum-tube voltmeter where the r.m.s voltage reading is used—in conjunction with a set of graphs—to indicate magnitude of barrier eccentricity, see FIG. 4. This same output voltage is clipped and fed into the 6BN6 gated-amplifier. Clipping prevents overdriving the 6BN6, and assists in the squaring process that follows. Output of the 6BN6 is clipped by a 6AL5 and fed into a high-mu triode whose output is a square wave of fast rise time relative to the period of the wave. The rise time is approximately 40 micro sec.

The negative portion of the square wave is clipped off and the positive excursion limited to about 30 v. by another 6AL5. The resulting waveform is then differentiated and triggers the 2D21 thyratron.

Figure 5:
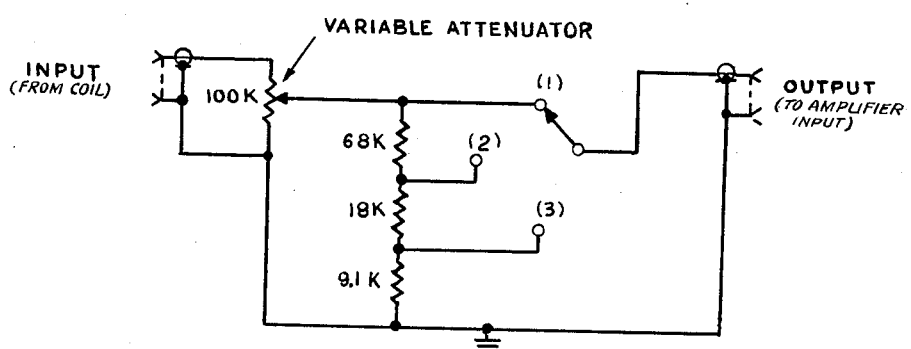
FIG. 5 is a circuit diagram of a switch and attenuator circuit.

The small box 12 mounted on top of the steel box to the left of the gage frame in FIG. 1 contains a switch and a three-position attenuator, FIG. 5. The switch is normally connected to the connector marked Monitor on the main chassis and turns off the flashtube portion of the circuit by grounding the grid of the high-mu triode amplifier. This increases flashtube life by minimizing unnecessary firing. The three-position attenuator reduces the wide range of coil voltages (5 to 700 millivolts) to the range that falls within the input capabilities of the linear amplifier. Thus accuracy of the instrument is enhanced by spreading the total range of barrier offset readings (0.001 to 0.125 in.) over three graphs instead of one, as shown in FIG. 4.

Bias control in the cathode circuit of the 6BN6, marked Symmetry, adjusts the symmetry of the two halves of the square wave output from the 6BN6. Proper setting of the Symmetry control determines the accuracy of the indication of position of maximum eccentricity. To set this control, a signal of approximately 40 to 50 millivolts r.m.s is fed into the feedback amplifier input from a signal generator. A CRO connected to Monitor displays the square-wave output. Also, the symmetry control is set to the position that makes each half of the square wave cover an equal time interval.

Figure 6:
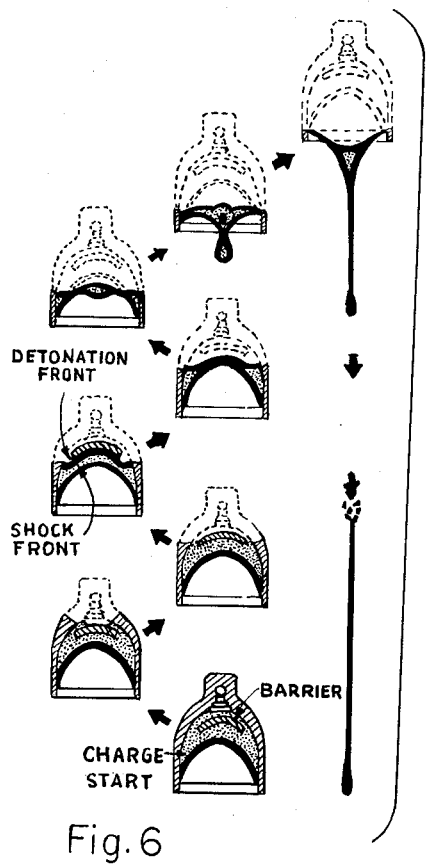
FIG. 6 is a diagrammatic view illustrating the explosion of a shaped charge perforating unit having a barrier, the unit being illustrative of those which are tested in the apparatus of the invention.

FIG. 6 shows what happens when a high-explosive barrier charge is detonated and illustrates the key role played by the curved steel barrier in shaping the direction and magnitude of the high-velocity jet of metal which perforates the metal casing, cement and formation, permitting the oil to enter the well.

This charge contains 19 grams of high explosive (Cyclonite) in a case made of Zamak 5 (94 percent zinc) with a barrier of mild steel centered as accurately as possible.

In manufacturing the shaped charge, a portion of the high explosive is first pressed into place with the open end of the case facing upward. The concave steel barrier is centered in the charge and the remaining portion of the high explosive is pressed into place and capped by a copper liner. Thus it becomes impossible to visually check whether the barrier has remained centered.

It is possible to locate placement of the encapsulated metal with an overall accuracy of approximately 0.001 in. in magnitude of eccentricity and plus or minus fifteen degrees in position of maximum eccentricity.

We claim:

1. Apparatus for measuring the degree of eccentricity of a ferromagnetic body which comprises: means establishing a magnetic field of constant intensity; means for rotating said body in said field at undetermined speed within a predetermined range of speeds; means in said magnetic field and responsive thereto for generating an electric signal which is a function of the variations in said field occasioned by rotation of said body in said field; electronic circuit means for amplifying said signal including circuit elements responsive to frequency of said signal for reducing the output voltage of the amplifier by an amount equal to the increase in the voltage of said signal with increase in signal frequency; and means for measuring the output of said amplifier.

2. Apparatus for measuring the degree of eccentricity of a ferromagnetic body which comprises: means establishing a magnetic field of constant intensity; means for rotating said body in said field at undetermined speed between about 5 and about 120 revolutions per second; means in said magnetic field and responsive thereto for generating an electric signal which is a function of the variations in said field occasioned by rotation of said body in said field; electronic circuit means for amplifying said signal including means for providing substantially constant amplifier output voltage for input signals generated by said means in said magnetic field at speeds of rotation of said body between about 5 and about 120 revolutions per second; and means for measuring the output of said amplifier.

3. Apparatus for measuring the degree of eccentricity and indicating the orientation of an eccentric ferromagnetic body which comprises: means establishing a magnetic field of constant intensity; means for rotating said body in said field at undetermined speed within a predetermined range of speeds; means in said magnetic field and responsive thereto for generating an electric signal which is a function of the variations in said field occasioned by rotation of said body in said field; electronic circuit means for amplifying said signal including circuit elements responsive to frequency of said signal for reducing the output voltage of the amplifier by an amount equal to the increase in the voltage of said signal with increase in signal frequency; means for measuring the output of said amplifier; a flashtube positioned to illuminate the rotating body; and electronic means responsive to the output of said electronic amplifying means for flashing said flashtube at the same point in each cycle of the output signal.

References Cited in the file of this patent

UNITED STATES PATENTS

| 2,634,317 | Marchand et al. | Apr. 7, 1953 |
| 2,924,773 | Lykke | Feb. 9, 1960 |

FOREIGN PATENTS

| 666,898 | Great Britain | Feb. 20, 1952 |